United States Patent [19]

Ueno et al.

[11] Patent Number: 4,639,344

[45] Date of Patent: Jan. 27, 1987

[54] PROCESS FOR PRODUCING FORMED ARTICLES OF AROMATIC POLYAMIDE-IMIDE RESIN

[75] Inventors: Katsuji Ueno; Kenji Nagaoka, both of Hirakata; Akira Miyashita; Satoshi Ebisu, both of Ibaraki, all of Japan

[73] Assignee: Sumitomo Chemical Company, Limited, Osaka, Japan

[21] Appl. No.: 617,632

[22] Filed: Jun. 6, 1984

[30] Foreign Application Priority Data

Jun. 16, 1983 [JP] Japan ................................ 58-109028

[51] Int. Cl.$^4$ ...................... B29B 13/02; B29C 43/00; C08J 3/00
[52] U.S. Cl. ........................................ 264/83; 264/239; 264/345; 264/DIG. 65; 428/473.5; 525/436; 528/350; 528/483
[58] Field of Search ......... 264/83, 239, 345, DIG. 65; 528/481, 483, 350; 525/436; 428/473.5

[56] References Cited

U.S. PATENT DOCUMENTS

| | | | |
|---|---|---|---|
| 3,541,038 | 11/1970 | Nakano et al. | |
| 3,600,361 | 8/1971 | Heacock et al. | 528/481 |
| 3,661,832 | 5/1972 | Stephens | 528/350 X |
| 3,748,304 | 7/1973 | Stephens | 528/210 X |
| 3,781,249 | 12/1973 | Lubowitz | 528/481 X |
| 4,016,140 | 4/1977 | Morello | 528/481 X |
| 4,145,526 | 3/1979 | Vanlautem et al. | 528/483 X |
| 4,167,620 | 9/1979 | Chen | 528/481 |
| 4,186,263 | 1/1980 | Morello | 528/350 X |
| 4,309,528 | 1/1982 | Keske et al. | 528/350 X |
| 4,401,590 | 8/1983 | Yoshimura et al. | 528/481 X |

FOREIGN PATENT DOCUMENTS

| | | |
|---|---|---|
| 1515066 | 3/1968 | France . |
| 40-8910 | 5/1965 | Japan . |
| 441927 | 1/1972 | Japan . |
| 1056564 | 1/1967 | United Kingdom . |

*Primary Examiner*—Philip Anderson
*Attorney, Agent, or Firm*—Stevens, Davis, Miller & Mosher

[57] ABSTRACT

In a process for producing a formed article of aromatic polyamide-imide resin by compression-molding at the temperature lower than the melting temperature of the resin, the improvement which comprises subjecting the resin, prior to the molding, to heat treatment in an oxygen-containing gas under conditions satisfying the following equation $$\log t \geq a_1 + a_2 T + a_3 T^2 + a_4 T^3,$$

wherein $a_1 = 2.5841$, $a_2 = -8.4926 \times 10^{-3}$, $a_3 = 6.9984 \times 10^{-6}$, and $a_4 = -2.0449 \times 10^{-8}$; t and T represent the heat-treatment time in hour and the heat-treatment temperature in °C., respectively; and 200° C. $\leq T \leq$ 400° C.

3 Claims, No Drawings

PROCESS FOR PRODUCING FORMED ARTICLES OF AROMATIC POLYAMIDE-IMIDE RESIN

This invention relates to a process for producing formed articles of aromatic polyamide-imide resin. More particularly, it relates to a process for compression-molding a powdery aromatic polyamide-imide resin stably and producing formed articles having excellent properties and no defect.

The aromatic polyamide-imide resin has recently attracted much attention as an important industrial material because it possesses excellent heat resistance, chemical resistance and electrical characteristics similar to those of aromatic polyimide resin and, in addition, more excellent mechanical characteristics and processability than those of the latter resin.

Various processes have been known for molding the aromatic polyamide-imide resin. Of these, the melt-molding process including injection molding proposed recently (see, for example, U.S. Pat. No. 3,748,304) is highly advantageous economically, and has contributed much to raise largely the usefulness of the said resin. But this process has a drawback in that it requires to use an aromatic polyamide-imide resin with good flowability and hence cannot be applied to an aromatic polyamide-imide resin having a sufficiently high heat resistance which is the inherent feature of the aromatic polyamide-imide resin.

A process of compression-molding a resin at the temperature lower than its melting temperature, which process is applied to aromatic polyimide resin and the like, is free from such a drawback. But when the process is applied to aromatic polyamide-imide resin, there emerges the problem that cracking and peeling take place in the formed article and hence formed articles of good quality cannot be obtained.

Under these circumstances, the inventors made extensive studies to establish a compression-molding process suitable for obtaining a formed article of aromatic polyamide-imide resin having a high heat resistance, which process is free from the problem mentioned above. As a result, it has been surprisingly found that when a powdery aromatic polyamide-imide resin material is heat-treated in an oxygen-containing gas, the treated material can be molded stably without development of cracking and peeling and, moreover, can produce formed articles having markedly more excellent properties than the resin which has undergone a similar heat treatment in a gas containing no oxygen. This invention has been accomplished on the basis of the above finding.

An object of this invention is to provide a formed article of aromatic polyamide-imide resin having both high heat resistance and excellent mechanical strength as well as a process for producing such formed articles.

Other objects and advantages of this invention will become apparent from the following descriptions.

According to this invention, there is provided, in a process for producing a formed article of aromatic polyamide-imide resin by compression-molding at the temperature lower than the melting temperature of the resin, the improvement which comprises subjecting the resin, prior to molding, to heat treatment in an oxygen-containing gas under conditions satisfying the following equation $$\log t \geq a_1 + a_2 T + a_3 T^2 + a_4 T^3 \quad (A),$$

wherein $a_1 = 2.5841$, $a_2 = -8.4926 \times 10^{-3}$, $a_3 = 6.9984 \times 10^{-6}$, $a_4 = -2.0449 \times 10^{-8}$; t and T represent the heat-treatment time in hour and the heat-treatment temperature in °C., respectively; and $200° C. \leq T \leq 400° C.$ The aromatic polyamide-imide resin in this invention refers to a polymer which contains 50% by mole or more of a recurring unit represented by the general formula

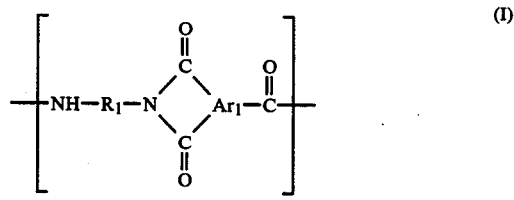

and optionally contains, in addition, less than 50% by mole of a recurring unit represented by the general formula

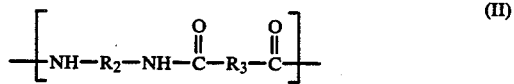

and/or the general formula

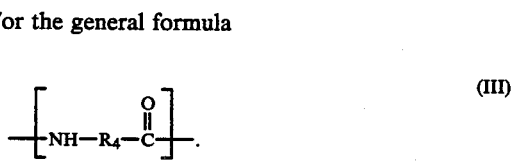

But the general formula (I) should be understood not as a formula expressing an exact structure but as an expedient one expressing merely that the corresponding diamine residues and aromatic tricarboxylic acid residues are present in approximately 1:1 molar ratio and implying that some portion of amic acid which has not been closed into an imide ring or some portion having head to head linkage structure are contained in the structure. Also, the aromatic polyamide-imide resin of this invention may contain a variety of terminal structures resulting from the use of terminal treating agents and the like.

Here, $Ar_1$ is one or more kinds of aromatic trivalent residues, and is featured by that the two valences with which the two carboxyl groups forming the acid anhydride grouping are to be bonded are positioned on adjacent carbon atoms. Specific examples of the $Ar_1$ group include the followings.

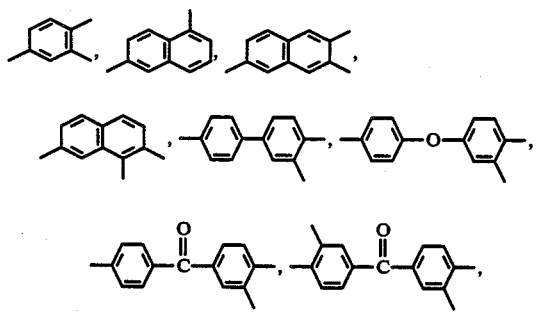

-continued

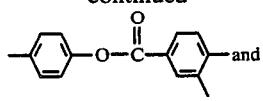

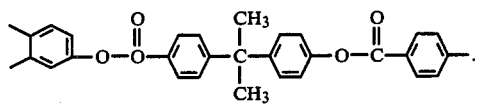

Of these, a preferred residue is

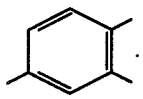

$R_1$, $R_2$, $R_3$ and $R_4$ each represents one or more kinds or aromatic, aliphatic or alicyclic divalent residues, and at least 70% by mole thereof comprise an aromatic divalent residue. Specific examples of such $R_1$, $R_2$, $R_3$ and $R_4$ include aromatic divalent residue such as

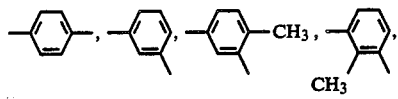

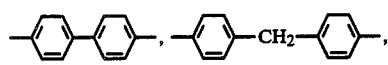

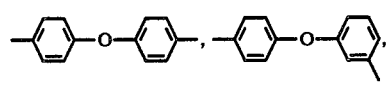

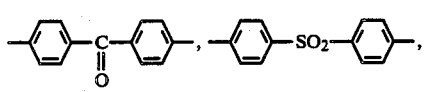

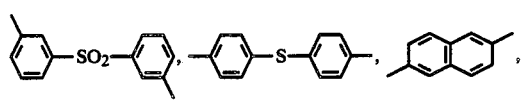

or substituted derivatives thereof; aliphatic divalent residues such as

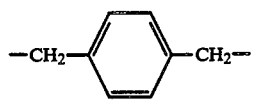

and —$(CH_2)_6$—; alicyclic divalent residues such as

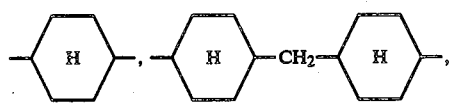

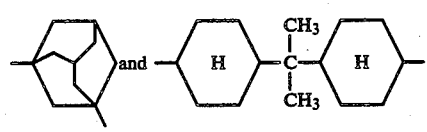

Of these, preferred are aromatic residues, and particularly preferred is

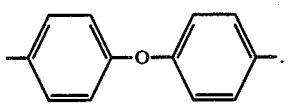

As preferred specific examples of the aromatic polyamide-imide resin of this invention, there may be mentioned so-called homopolymers comprising substantially a single recurring unit represented, for example, by the following formula:

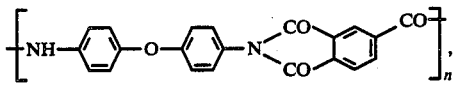

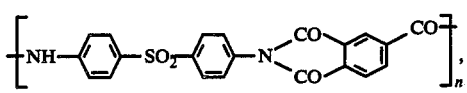

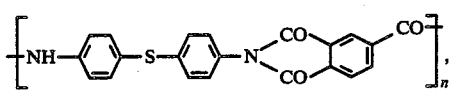

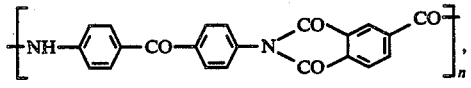

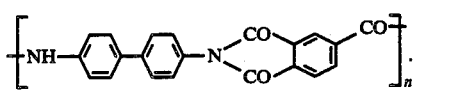

wherein, n is a number of 20 to 1000.

Various processes are known for producing these aromatic polyamide-imide resins. These include, for example, a process to react an acyl halide derivative of an aromatic tricarboxylic anhydride with an aromatic diamine in the presence of a polar organic solvent such as N,N-dimethylacetamide, N-methylpyrrolidone or dimethylsulfoxide (U.S. Pat. No. 3,661,832; Japanese Patent Publication No. 15637/67), a process to react an aromatic tricarboxylic anhydride with an aromatic diamine in a polar organic solvent with boric acid or the like used as catalyst (French Pat. No. 1,515,066), a process to heat an aromatic tricarboxylic anhydride and an aromatic diisocyanate to cause reaction (Japanese Patent Publication Nos. 8910/65 and 19274/69) and so-called precipitation polycondensation process wherein an aromatic tricarboxylic anhydride and an aromatic diisocyanate are heated to react in a polar aromatic solvent with a tertiary amine used as catalyst (Japanese Patent Publication No. 44719/79). Of these processes, the process to react an aromatic tricarboxylic anhydride with an aromatic diamine is preferable because of its excellent economical efficiency.

The above-mentioned aromatic polyamide-imide resin used in this invention should be in the form of powder or granules. To obtain a formed article having good mechanical characteristics, the primary particles of said powdery or granular aromatic polyamide-imide resin are preferably of fine size; average particle diameter is preferably about 30$\mu$ or less, and more preferably 20$\mu$ or less. The average particle diameter as referred to herein means a weight average diameter or a weight-base median diameter determined for primary particles. These diameters can be determined by such means for measuring particle size as photomicrography of the powder, classification by sieving or measurement with Coulter Counter.

The oxygen-containing gas as referred to in this invention means a gas containing oxygen in a concentration sufficient for the effect according to this invention to be exhibited. Generally, gases containing 5% or more, preferably 10% or more, of oxygen are used. Specific examples of oxygen-containing gases include air, oxygen, nitrogen containing oxygen, and argon containing oxygen. Of these, a preferred oxygen-containing gas is air.

In the process of this invention, the temperature and time constituting the conditions for heat treatment are selected so as to satisfy the aforementioned equation (A), said equation indicating the range of heat-treatment time which can be permitted when a specified heat-treatment temperature within the range of 200° to 400° C. is selected. To explain further, the right side of the equation expresses the lower limit of the required time of heat treatment. A heat-treatment time shorter than said lower limit is unfavorable because then the cracking and peeling cannot be avoided. The upper limit of the heat-treatment time should be determined, according to the type of the aromatic polyamide-imide resin, in a range not causing the deterioration of the physical properties due to thermal or oxidative degradation, and so cannot be determined uniformly, but it is normally 300 hours or less. Preferred upper limit of heat treatment may be expressed by the following equation (B).

$$\log t = b_1 + b_2 T + b_3 T^2 + b_4 T^3 \qquad (B)$$

wherein $b_1 = 13.7803$, $b_2 = -0.12268$, $b_3 = 4.3932 \times 10^{-4}$, $b_4 = -5.5771 \times 10^{-7}$; t and T represent the heat-treatment time in hour and the heat-treatment temperature in °C., respectively; and 200° C.$\leq$T$\leq$400° C.

The heat-treatment temperature is selected from the range of 200° to 400° C., preferably 280° to 390° C. A heat-treatment temperature below 200° C. or above 400° C. is unfavorable because in the former case the intended effect cannot be obtained within a practical treating time and in the latter case the aromatic polyamide-imide resin undergoes a rapid oxidative decomposition.

For heat treatment, a variety of conventional methods for heating a powder material can be used. These methods include, for example, static treatment in an oven, fluidization with a heated gas, and heat treatment with stirring in a paddle dryer or a tumbler dryer.

In the process of this invention, a variety of fillers may be incorporated as desired into the aforementioned powdery aromatic polyamide-imide resin for the purpose of improving such properties of the product as lubricating property or abrasion resistance. Examples of such fillers include graphite, fluorocarbon resin, silicon carbide, molybdenum disulfide, boron nitride, metal oxide and metal sulfide.

In the process of this invention, the compression-molding temperature is selected to be below the melting temperature of the objective aromatic polyamide-imide resin. The melting temperature herein refers to a temperature at which the resin becomes substantially flowable under a shearing stress of about 10 kg/cm applied thereto, in other words a temperature at which the apparent melt viscosity of the resin reaches about $1 \times 10^8$ poises or less, and can be easily determined by means of, for example, a melt indexer or Kōka-type flow tester. Preferred compression-molding temperature is from room temperature to about 400° C., and more preferred one is from 280° C. to 390° C. A compression-molding temperature higher than the melting temperature is unfavorable because it causes decomposition of the resin, thus producing only a formed article of poor properties.

In exercising the process of this invention, the molding pressure may be selected as desired according to the type of objective aromatic polyamide-imide resin and the molding temperature, but is usually about 100 kg/cm² or more, preferably 300 to 5000 kg/cm². For applying the pressure, various pressurizing methods may be used. For example, the resin is filled in a mold and pressure is applied thereto from one direction with a plunger, or static pressure is applied thereto with a rubber press and the like. A continuous method such as ram extrusion may also be used.

The pressurizing time is not restricted specifically, but a time of 1 to 60 minutes is usually adopted. The pressure is released after a predetermined time of pressurization, and immediately, or after some time, the formed article of the aromatic polyamide-imide resin is taken out of the pressurizing apparatus.

The formed article of the aromatic polyamide-imide resin thus obtained is used as it is, or after formed into a desired shape by machining, etc. as required, for various applications. The formed article taken out of the pressurizing apparatus has generally a sufficiently good properties as it is. But when an even better mechanical or thermal properties are desired, the article is subjected to a heat treatment with no pressure applied thereto. For the treatment, there are selected conditions of a temperature of 270° to 400° C. and a time of 5 minutes to 120 hours.

According to the process of this invention described in the foregoing, it is possible to produce and furnish stably the formed articles of the aromatic polyamide-imide resin which have both high heat resistance and good mechanical characteristics and can be used in various fields of applications including electrical parts, machine parts and sliding parts; thus a great industrial advantage can be obtained.

The process of this invention is described further in detail below with reference to Examples, but the scope of the present process is not restricted by these Examples.

The reduced viscosity ($\eta_{sp}/c$) as referred to in Examples is the value determined with a N-methylpyrrolidone solution at a concentration of 0.5 g/100 ml and a temperature of 25° C.

The average particle diameter was determined by dispersing a portion of the powdery aromatic polyamide-imide resin in methanol, taking a photomicrograph of a specimen prepared from a portion of the resulting slurry on a slide glass, reading 1000 or more particle images on the photograph by the use of Particle Size Analyzer (mfd. by Karl-Zeiss Co.), and calculating the weight average diameter.

The heat distortion temperature was determined according to ASTM D 648 with a test piece of 4 mm thick, 7.4 mm wide and 40 mm long under conditions of a span between supporting points of 30 mm, a bending stress of 18.6 kg/cm² and a bending strain of 2%.

The flexural strength and the strain at break were determined according to ASTM D 790 with a test piece of 4 mm thick, 10 mm wide and 60 mm long under conditions of a span between supporting points of 50 mm and a deformation speed of 2 mm/minute.

REFERENCE EXAMPLE

Into a reactor of 5 l inner volume provided with a thermometer, an inlet tube for nitrogen, an outlet for distillate, a stirrer and an external heating device, were placed 576 g (3 mol) of trimellitic anhydride, 600 g (3 mol) of 4,4'-diaminodiphenyl ether, 23.3 g (0.075 mol) of triphenyl phosphite and 3 l of sulfolane, and the mixture was heated up to an inner temperature of 210° C. over a period of about one hour while nitrogen being blown through the liquid. During the course of temperature rising, the water formed began to distill out at an inner temperature of about 140° C., and about 95% of the theoretical amount of water had been distilled out when the temperature reached 210° C.

The stirring was continued for 5 hours at 210° C. with continued nitrogen blowing. At the end of the time the reaction mixture had turned into a viscous slurry.

The reaction mixture was then taken out of the reactor and poured into a large amount of distilled water. The resultant mixture was dispersed with a home mixer to give a slurry, which was then subjected to centrifugal filtration to isolate solid polymer. The polymer was washed twice with boiling acetone, and the wet polymer finally obtained was pulverized in an automatic mortar, and then dried under vacuum for 24 hours at 160° C. and additional 24 hours at 240° C. There was obtained 1035 g (96.9% yield) of a polymer in the form of fine, fresh-green powder. The polymer was confirmed by elementary analysis and infrared absorption spectroscopy to be the aromatic polyamide-imide resin represented by the formula

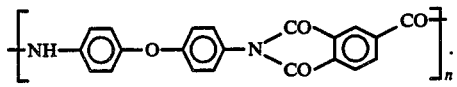

The reduced viscosity, melting temperature, and average particle diameter of the aromatic polyamide-imide resin were 0.764 dl/g, higher temperature than 380° C. and 12μ, respectively.

EXAMPLES 1 to 4, COMPARATIVE EXAMPLES 1 to 4

The powdery aromatic polyamide-imide resin prepared in Reference Example was heated in static state in a heater, in which a heated gas indicated in Table 1 was circulated and a portion of the gas was ventilated continuously, at a temperature and for a period of time indicated in Table 1.

Then, 65 g of the heat-treated resin was filled in a cylindrical mold of 76 mm in inside diameter preheated at 360° C., allowed to stand for 15 minutes with no pressure applied, and then hold for 15 minutes under a pressure of 650 kg/cm² applied with an oil hydraulic plunger. Then the pressure was released, and the disc-shaped article of the aromatic polyamide-imide resin thus formed was taken out of the mold. The formed article was inspected for the presence or absence of cracking or peeling. The results were as shown in Table 1.

EXAMPLES 5 to 10, COMPARATIVE EXAMPLES 5 and 6

Formed articles of the aromatic polyamide-imide resin were obtained by conducting heat treatment and compression molding in exactly the same manner as in Example 1 except that the gas, temperature and time in the heat treatment were those indicated in Table 2. Test pieces for measuring physical properties were prepared from the formed article by machining, and postcured in nitrogen atmosphere at 245° C. for 24 hours and at 320° C. for 48 hours, and then examined for their physical properties. The results were as shown in Table 2.

TABLE 1

| No. | Heat treatment condition Gas | Temperature (°C.) | Time (hour) | Defect in the formed article of aromatic polyamide-imide resin Cracking | Peeling |
|---|---|---|---|---|---|
| Example 1 | Air | 250 | 4 | No | No |
| Comparative Example 1 | " | " | 2 | Yes | Yes |
| Example 2 | " | 300 | 2 | No | No |
| Comparative Example 2 | " | " | 1 | Yes | Yes |
| Example 3 | " | 340 | 0.67 | No | No |
| Comparative Example 3 | " | " | 0.34 | Yes | No |
| Example 4 | Nitrogen containing oxygen[a] | 390 | 0.2 | No | No |
| Comparative Example 4 | Nitrogen | " | " | Yes | Yes |

Note:
[a]Gas mixture of nitrogen and oxygen, containing about 11% of oxygen.

TABLE 2

| No. | Heat treatment condition Gas | Temperature (°C.) | Time (hour) | Heat distortion temperature (°C.) | Flexural strength (kg/cm²) | Strain at break (%) |
|---|---|---|---|---|---|---|
| Example 5 | Air | 340 | 4 | >300 | 2010 | 7.2 |
| Comparative Example 5 | " | 360 | 0.2 | Not determined | 620 | 2.4 |
| Example 6 | " | " | 0.5 | Not determined | 1820 | 6.1 |
| Example 7 | " | " | 1 | >300 | 2360 | 9.1 |
| Example 8 | " | " | 2.5 | >300 | 2050 | 7.6 |
| Example 9 | " | " | 5 | Not determined | 1640 | 5.2 |
| Comparative Example 6 | Nitrogen | " | 2.5 | Not determined | 1210 | 4.1 |
| Example 10 | Air | 380 | 0.5 | >300 | 2170 | 8.2 |

What is claimed is:

1. In a process for producing a formed articles of aromatic polyamide-imide resin by compression-molding at a temperature lower than the melting temperature of the resin, said aromatic polyamide-imide resin comprising a substantially single recurring unit represented by the formula

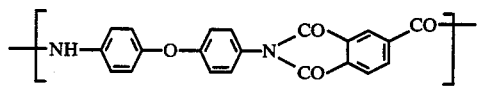

the improvement which comprises subjecting the resin, prior to molding, to heat treatment in an oxygen-containing gas under conditions satisfying the following equation $$\log t \geq a_1 + a_2 T + a_3 T^2 + a_4 T^3,$$

wherein $a_1 = 2.5841$, $a_2 = -8.4926 \times 10^{-3}$, $a_3 = 6.9984 \times 10^{-6}$, and $a_{N/} = -2.0449 \times 10^{-8}$; t represents the lower limit for the heat-treatment time in hours and T represents the heat-treatment temperature in °C.; and 200° C. $\leq T \leq$ 400° C.

2. A process for producing a formed article of aromatic polyamide-imide resin according to claim 1, wherein the heat treatment is conducted under conditions satisfying the equation $$a_1 + a_2 T + a_3 T^2 + a_4 T^3 \leq \log t \leq b_1 + b_2 T + b_3 T^2 + b_4 T^3,$$

wherein $a_1 = 2.5841$, $a_2 = -8.4926 \times 10^{-3}$, $a_3 = 6.9984 \times 10^{-6}$, $a_4 = -2.0449 \times 10^{-8}$, $b_1 = 13.7803$, $b_2 = -0.12268$, $b_3 = 4.3932 \times 10^{-4}$, and $b_4 = -5.5711 \times 10^{-7}$; t and T represent the heat-treatment time in hour and the heat-treatment temperature in °C., respectively; and 200° C. $\leq T \leq$ 400° C.

3. A process for producing a formed article of aromatic polyamide-imide resin according to claim 1, wherein the heat-treatment temperature is 280° to 390° C.